US009552370B1

(12) United States Patent
McCloskey et al.

(10) Patent No.: US 9,552,370 B1
(45) Date of Patent: Jan. 24, 2017

(54) SIGNALING IMPENDING OUT OF STORAGE CONDITION FROM A VIRTUAL TAPE DRIVE

(71) Applicant: EMC Corporation, Hopkinton, MA (US)

(72) Inventors: Larry W. McCloskey, Burlington, MA (US); Bruce F. Offhaus, Waldoboro, ME (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 238 days.

(21) Appl. No.: 13/929,558

(22) Filed: Jun. 27, 2013

(51) Int. Cl.
*G06F 17/30* (2006.01)

(52) U.S. Cl.
CPC .................. *G06F 17/30233* (2013.01)

(58) Field of Classification Search
CPC ............. G06F 17/30067; G06F 17/30088
USPC .......................................... 707/822
See application file for complete search history.

(56) References Cited

U.S. PATENT DOCUMENTS

| 4,445,177 | A | * | 4/1984 | Bratt | G06F 8/41 712/245 |
| 4,455,602 | A | * | 6/1984 | Baxter, III | G06F 13/18 710/39 |
| 4,493,027 | A | * | 1/1985 | Katz | G06F 9/4425 712/228 |
| 4,525,780 | A | * | 6/1985 | Bratt | G01R 31/318505 711/163 |
| 5,848,438 | A | * | 12/1998 | Nemazie | G11B 20/1252 360/48 |
| 6,651,073 | B1 | * | 11/2003 | Lyle | G06F 11/1471 |
| 6,725,241 | B1 | * | 4/2004 | Rodriguez | G06F 12/023 |
| 8,458,422 | B1 | * | 6/2013 | Holdman et al. | 711/162 |
| 8,856,450 | B2 | * | 10/2014 | Beeston et al. | 711/130 |
| 9,190,124 | B2 | * | 11/2015 | Fanning | G11C 7/1006 |
| 2006/0031653 | A1 | * | 2/2006 | Todd | G06F 3/0622 711/170 |
| 2006/0242378 | A1 | * | 10/2006 | Kano | 711/170 |
| 2008/0104356 | A1 | * | 5/2008 | Nagai et al. | 711/170 |
| 2009/0006799 | A1 | * | 1/2009 | Korupolu | G06F 3/0608 711/170 |

(Continued)

OTHER PUBLICATIONS

IBM Magstar 3590 Tape Subsystem, "Hardware Reference"; GA32-0331-03; Fourth Edition, Sep. 2000.

*Primary Examiner* — Noosha Arjomandi
(74) *Attorney, Agent, or Firm* — Hamilton, Brook, Smith & Reynolds, P.C.

(57) ABSTRACT

In one embodiment, a method of informing a mainframe that a filesystem storing a plurality of virtual tapes is filled relative to a particular threshold includes returning, responsive to a write request to a virtual tape in the filesystem, a message indicating that the filesystem is filled relative to the particular threshold. The method can also include monitoring a plurality of filesystems for free space remaining on each of the plurality of filesystems. The method can additionally include indicating, in a data structure stored in a memory, a particular filesystem that is filled above the particular threshold. The data structure can be at least one of a table and a list. The method can further include mounting, responsive to a request to mount a particular virtual tape that is on a filesystem indicated in the data structure as being above the particular threshold, the particular virtual tape as read-only.

14 Claims, 7 Drawing Sheets

(56) References Cited

U.S. PATENT DOCUMENTS

| | | | |
|---|---|---|---|
| 2009/0100163 A1* | 4/2009 | Tsao | H04L 41/12 709/223 |
| 2009/0119529 A1* | 5/2009 | Kono et al. | 713/324 |
| 2009/0271544 A1* | 10/2009 | Oishi | G06F 5/12 710/53 |
| 2011/0010495 A1* | 1/2011 | Haustein et al. | 711/111 |
| 2011/0016095 A1* | 1/2011 | Anglin | G06F 11/1453 707/692 |
| 2012/0078846 A1* | 3/2012 | Gold et al. | 707/644 |
| 2012/0117029 A1* | 5/2012 | Gold | G06F 11/1451 707/651 |
| 2013/0111129 A1* | 5/2013 | Maki | G06F 3/0611 711/117 |
| 2014/0040576 A1* | 2/2014 | Cordero | G06F 11/2221 711/162 |
| 2014/0089269 A1* | 3/2014 | Akirav | G06F 17/30156 707/689 |
| 2014/0095816 A1* | 4/2014 | Hsu | G06F 3/0655 711/162 |
| 2014/0095817 A1* | 4/2014 | Hsu | G06F 11/1438 711/162 |
| 2014/0281330 A1* | 9/2014 | Baldwin et al. | 711/170 |
| 2014/0297695 A1* | 10/2014 | Dejana | G06F 17/30312 707/812 |

\* cited by examiner

SIGNALING IMPENDING OUT OF STORAGE CONDITION FROM A VIRTUAL TAPE DRIVE

BACKGROUND

Systems that employ physical tape drives include a mechanism to notify a host that the physical tape drive is approaching full storage capacity. In such systems, the mechanism to determine that the physical tape drive is approaching its full storage capacity is by a reflector on the tape at a set location near the end of the tape. The system can then detect reflected light from the reflector when the tape reaches the set location and return a signal to the host that the tape is almost out of storage capacity.

BRIEF DESCRIPTION OF THE DRAWINGS

Example embodiments are illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1A:
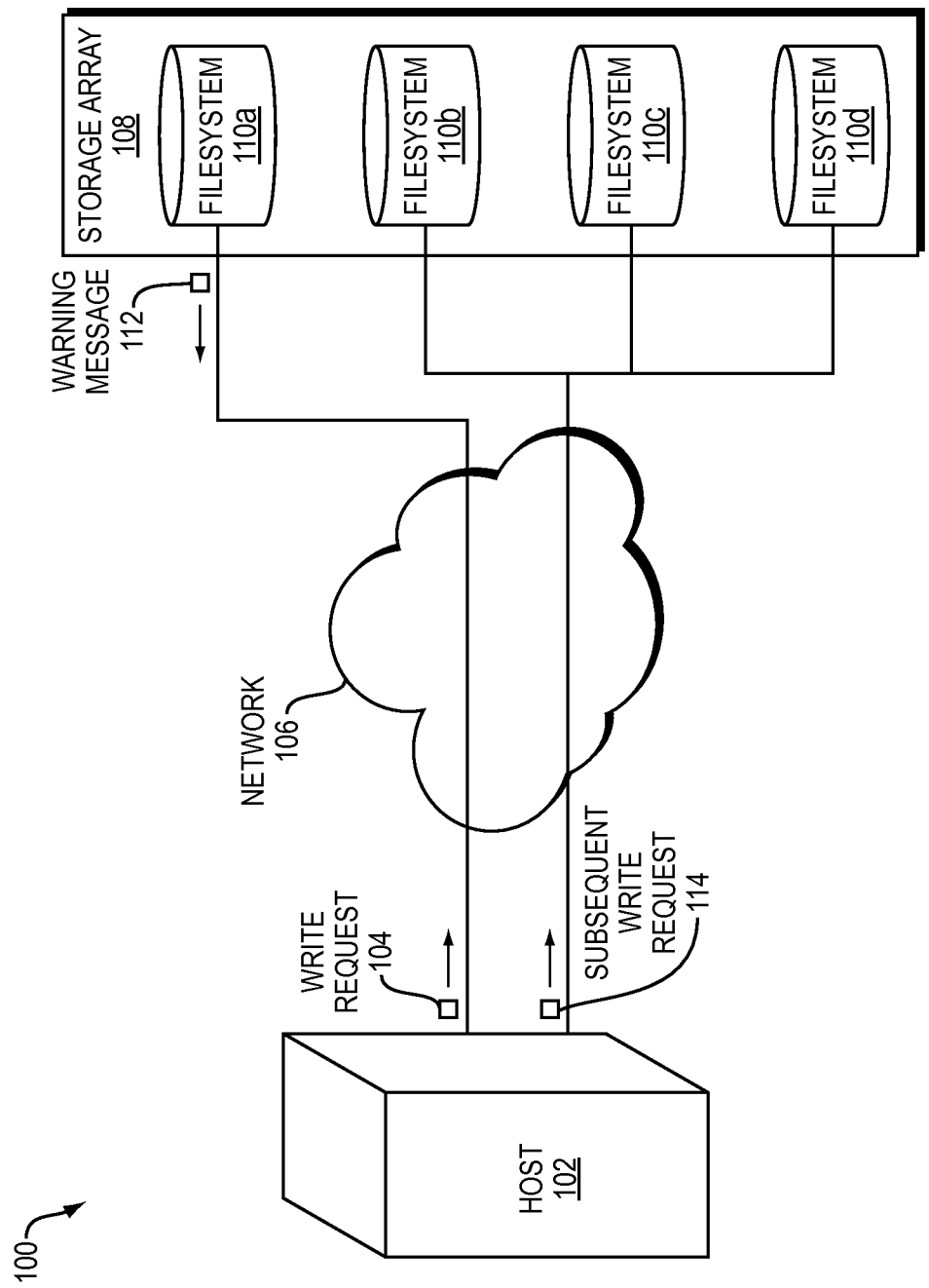
FIG. 1A is a block diagram illustrating an example embodiment of the present invention.

A description of example embodiments of the invention follows.

In one embodiment, a method of informing a mainframe that a filesystem storing a plurality of virtual tapes is filled relative to a particular threshold includes returning, responsive to a write request to a virtual tape in the filesystem, a message indicating that the filesystem is filled relative to the particular threshold.

In another embodiment, the method can include monitoring a plurality of filesystems, each filesystem storing a plurality of virtual tapes, for free space remaining on each of the plurality of filesystems. The method can additionally include indicating, in a data structure stored in a memory, a particular filesystem that is filled above the particular threshold. The data structure can be at least one of a table and a list. The method can further include mounting, responsive to a request to mount a particular virtual tape that is on a filesystem indicated in the data structure as being above the particular threshold, the particular virtual tape as read-only.

Another embodiment can include, responsive to a request to initiate a scratch mount, directing the request to a filesystem that is filled below the particular threshold.

In a further embodiment, the method can include, responsive to a usage balancing move request, directing the request to a filesystem that is filled below the particular threshold. The method can additionally include configuring the particular threshold responsive to a user input.

In one embodiment, a system for informing a mainframe that a filesystem storing a plurality of virtual tapes is filled relative to a particular threshold can include a messaging module configured to return, responsive to a write request to a virtual tape in the filesystem, a message indicating that the filesystem is filled relative to the particular threshold.

In one embodiment, the message can indicate that the filesystem is filled above the particular threshold. The message can also indicate that the filesystem is filled below the particular threshold. The system can further be configured to send the message after the filesystem has exceeded or fallen below the particular threshold. The system, in certain embodiments, sends the mainframe only after the particular threshold has been exceeded or fallen below.

The system can further include a monitor module configured to monitor a plurality of filesystems, each filesystem storing a plurality of virtual tapes, for free space remaining on each of the plurality of filesystems. The system can additionally include a tracking module configured to indicate, in a data structure stored in a memory, a particular filesystem that is filled above the particular threshold.

In another embodiment, a non-transitory computer-readable medium can be configured to store instructions for informing a mainframe that a filesystem storing a plurality of virtual tapes is filled above a particular threshold. The instructions, when loaded and executed by a processor, cause the processor to return, responsive to a write request to a virtual tape in the filesystem, a message indicating that the filesystem is filled above the particular threshold.

In a virtual tape environment, the virtual tape data is stored on a disk (e.g., a hard drive) rather than on a fixed-size physical tape. The disk holding the virtual tape may become full before reaching the virtual capacity of one of its virtual tapes.

In one embodiment, the present invention provides a method for returning a warning message (e.g., a non-fatal signal) to a host system indicating that a filesystem storing a virtual tape that the host is writing to is approaching the point of being full. After the host issues a write request to write a block of data to the virtual tape drive, the virtual tape drive checks the amount of free space available on the disk storage. If the amount of free space is below a specific, configurable limit, the write request is performed, but the virtual tape drive returns a "Logical End of Tape" (LEOT) status message to the host and a "successful write" status in response to the host write command. The LEOT status is similar to a LEOT status that a physical (e.g., non-virtual) tape drive returns to a write when it approaches the end of the physical tape medium. With physical tape drives, the host is expected to recognize the LEOT signal, close and unload the tape, and resume writing, if necessary, to a new physical tape volume.

In systems using virtual tape drives, many virtual tapes are stored on a same physical medium (e.g., a hard drive). While virtual tapes can be of various configurable sizes, the physical medium of the hard drive can be filled. Likewise, while the usage capacity of the virtual tape drives stored on the physical medium does not have to be monitored, the used space of the physical medium does need to be monitored in order to prevent the host from issuing write requests to a filesystem with no free space. Before the present invention, virtual tape emulation had no mechanism for signaling that a filesystem is running of out disk storage. This results in the host writing to a filesystem until storage is exhausted. When the host issues a write request to a filesystem with no storage available, the filesystem returns a fatal error to the host in response to the write request.

A network filesystem (NFS) does not provide real-time feedback to a specific write command if the write failed due to the NFS being full. The NFS returns an indication that write requests have failed only after performing an fsync operation or after closing of the file. Therefore, a significant number of writes may be acknowledged to the host as being successfully written, while the data is actually lost because the NFS has no room to store the file.

The customer (e.g., the entity running the host) may or may not ignore the warning and error messages associated with the filesystem being full, or may not react in time to the warnings to prevent loss of data due to the full filesystem. Data being lost in this way is most often discovered much later when the file is read, long after the write requests are complete. Depending on how the data is accessed, the NFS can report the corruption might be reported as a CRC error, a bad AWS header, or as a decompression error.

The present system and method provides the host a non-fatal (e.g., "soft") warning of impending storage shortage via a mechanism that host systems already are configured to recognize as the condition of approaching end of tape. Host programs already know how to handle this condition by terminating writing to a tape and continuing on another tape, without any detrimental affect on host processes.

To reduce the chance of such data losses, whenever a filesystem has surpassed a particular threshold of capacity, the filesystem issues a warning message reporting the critical shortage of space. As long as the usage of the filesystem is above the critical threshold, the filesystem can redirect scratch mount requests to filesystems that are not filled above the particular threshold. In previous systems, a filesystem is eligible for scratch mount allocation if it currently has enough space to hold one complete virtual tape (based on the virtual tape drive set for the particular filesystem).

The filesystem can further redirect load-balancing mount moves from the critically-short filesystem(s) to filesystems that are not filled above the critical threshold. In previous systems, a filesystem is eligible to be a load balancing move target if (1) the filesystem has at least 1 megabyte (MB) free; (2) the filesystem currently has enough space to hold one complete virtual tape (based on the virtual tape drive set for the particular filesystem) or a setting to use the entire filesystem is enabled, and (3) the filesystem has at least free space available to store the origin directory and an additional buffer space, for example, a total of 102% of the size the origin directory.

The filesystem is further configured to mount specific-volume-serial-number mounts as read-only on the critically-short filesystem(s).

The filesystem also, as described above, returns a LEOT warning message to write requests to the critically-short filesystem(s). The system, by default, enables each of these critical space behaviors, but the user can enable or disable each behavior individually.

The threshold value is a user configurable value. The threshold value can be global, where one threshold value applies to all filesystems, or a plurality of values, where each filesystem has its own customizable threshold value. In one embodiment the threshold has a global default value of 97%. The threshold value can be any value from 0 to 100%.

In one embodiment, if a filesystem falls below the particular threshold (e.g., due to a virtual tape being deleted, etc.), the filesystem can issue a message to the host that the filesystem storage is below the particular threshold. The host, upon receiving such a message, should be configured to be able to issue write requests to the filesystem again.

The filesystem can further send messages to the host reporting that a filesystem is being bypassed either for scratch allocation or as an EFS move target. The filesystem does not send a message when a volume is mounted read-only. Rather, an indication that the volume is read-only is displayed in a "volume mounted" reporting message.

FIG. 1A is a block diagram 100 illustrating an example embodiment of the present invention. A host 102 issues a write request 104 over a network 106 to a storage array 108. The storage array 108 includes a plurality of filesystems 110a-d. Each filesystem 110a-d stores multiple virtual tape drives. Write requests from the host 102 can each be directed to one or more of the virtual tape drives within the filesystem 110a-d. The virtual tape drives within each filesystem can be of various sizes; however, each filesystem 110a-d itself has a fixed capacity determined by the hardware used to implement the filesystem. Likewise, the filesystems 110a-d can run out of space to mount and store data in additional virtual tape drives.

When a particular filesystem 110a-d runs out of space to store additional virtual tape data, the host 102 becomes aware that the particular filesystem 110a-d is at capacity only after a delay. The host 102, unaware that the particular filesystem 110a-d is at capacity, can therefore still direct write requests to the particular filesystem 110a-d that is at capacity, even though the particular filesystem 110a-d cannot fulfill the write request because the particular filesystem 110a-d is full. Such a sequence of events can cause data loss because the host 102 does not know that its write requests are not being executed at the particular filesystem 110a-d until a later time, when the host 102 may not have access to the data of the write requests.

To prevent such a situation, a filesystem 110a that is filled above a particular threshold (e.g., above 95% filled) can return a warning message 112 to the host 102 indicating that the filesystem 110a is nearly full. The host 102 becomes aware that the particular filesystem 110a is nearly full due to the warning message. The host 102, knowing that filesystem 110a is nearly full, issues a subsequent write request 114 to filesystems 110b-d (and does not issue the subsequent write request 114 to filesystem 110a) due to the warning message. The host 102 redirects all write requests to filesystems 110b-d that are not full and avoids forwarding write requests to filesystem(s) 110a that are full.

The host 102 is configured to interface with a storage array 108 that emulates physical tape drives. Likewise, the host 102 is already configured to be agnostic to the storage array 108 having virtual tape drives instead of physical tape drives. The host 102 can therefore receive messages from the virtual tape drives that physical tape drives typically generate and respond to the messages, agnostic to whether the tape drives are virtual or physical. Therefore, the host 102 receives a warning messages as an LEOT message which is a type of message that physical tape drives send when the virtual tape drive reaches the particular threshold. The host 102 already knows how to handle an LEOT message, so it is not necessary to reprogram or further configure the host 102 to handle the warning message.

The storage array 108 further employs a process that periodically checks each filesystem 110a-d for their storage free space. If the storage free space of a filesystem 110a-d is below the particular threshold, the process marks an entry in a data structure, such as a list, table, or other data structure, that the filesystem is available. Conversely, if the storage free space of a filesystem 110a-d is above the particular threshold, the process marks an entry in the data structure that the filesystem is unavailable. The storage array 108 can access the data structure faster than checking each of the individual filesystems 110a-d at the time of each write or mount request. The data structure allows faster redirection of writes and mounts to available filesystems 110b-d.

If the host 102 issues a volume specific mount request to the filesystem 110a that has returned the warning message 112 to the host 102, the host 102 can mount the virtual tape drive in the volume specific mount request as a read-only mount. The host 102 can assume that the volume specific mount request implies the host needs to read from the mount because the host 102 is already aware that the filesystem is filled beyond the particular threshold, and should not be configured to issue write requests to the filesystem with this awareness. The host 102 can allow the reading of the virtual tape drive within the filesystem 110a. However, it is not advisable for the host 102 to allow writes to the virtual tape drive within the filesystem 110a because the filesystem 110a is above the particular threshold.

In certain embodiments, the storage array 108 may balance storage across the plurality of filesystems 110a-d by moving virtual tapes from one of the filesystems 110a-d to another of the filesystems 110a-d. Upon such a request from the host 102 to perform a function that causes the storage array to perform such a move of the virtual tapes among the filesystems 110a-d, the storage array 108 excludes writing to a filesystem 110a that is filled above the particular threshold.

The host 102 may also issue a scratch mount request to the storage array 108. A scratch mount request creates a temporary virtual tape to which the host 102 can write data. The storage array 108 chooses the filesystem 110a-d to write to by referencing a table storing which filesystems 110a-d are above and below the particular threshold, determining which filesystems 110a-d are below the particular threshold, and selecting one of those filesystems 110a-d that is below the threshold.

The threshold, as described herein, can also be user configurable. In one embodiment, the threshold can be 95% of the filesystem 110a-d capacity. However, the user can adjust the threshold to be any percentage. The threshold can also be a fixed amount of space on the filesystem 110a-d instead of a percentage. The user may consider factors such as the total capacity of the filesystem 110a-d in adjusting the particular threshold.

Figure 1B:
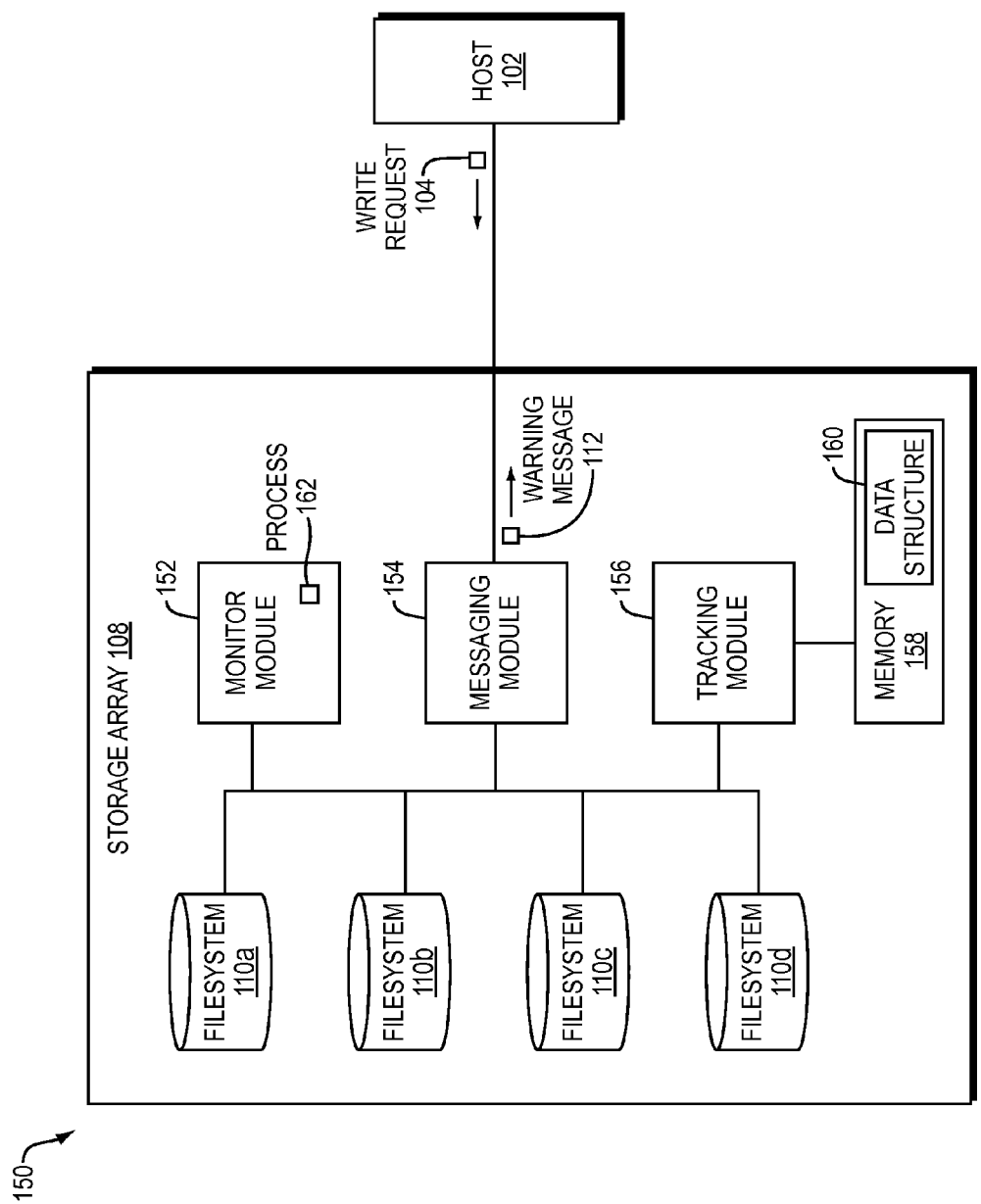
FIG. 1B is a block diagram illustrating an example embodiment of a storage array coupled with the host.

FIG. 1B is a block diagram 150 illustrating an example embodiment of the storage array 108 coupled with the host 102. The storage array, as in FIG. 1A, includes a plurality of filesystems 110a-d. The filesystems 110a-d are each coupled with a monitor module 152, a messaging module 154 and a tracking module 156 (e.g., coupled individually or through a communications bus).

The messaging module 154 is configured to send a warning message 112 to the host 102, responsive to a write request 104 to a particular one of the filesystems 110a-d that stores data on the particular filesystem 110a-d over a particular storage threshold. In another embodiment, the messaging module 154 can send a message responsive to the write request 104 if the particular filesystem 110a-d, previously storing data above the threshold level, stores less data than the threshold.

The monitor module 152 employs a process 162 that periodically monitors the filesystems 110a-d. The process 162, which can be executed by a processor, periodically queries each filesystem 110a-d for its status, including the capacity to which the filesystem 110a-d is filled. The process can query all of the filesystems 110a-d simultaneously, or spread the queries to each filesystem 110a-d over time (e.g., to prevent a sudden spike of data along a communications bus). The monitor module 152 can forward the free space remaining on each filesystem 110a-d to the tracking module 156.

The tracking module 156, responsive to receiving free space available of a particular or multiple filesystem 110a-d, updates the data structure 160. The data structure 160 indicates whether each filesystem 110a-d has surpassed the particular threshold. The data structure 160 can indicate this by, for example, a Boolean value indicating whether the threshold has been reached, a Boolean value indicating whether the drive is available for writing, or storing the free space available or total spaced used and storage capacity of each filesystem 110a-d.

Figure 2A:
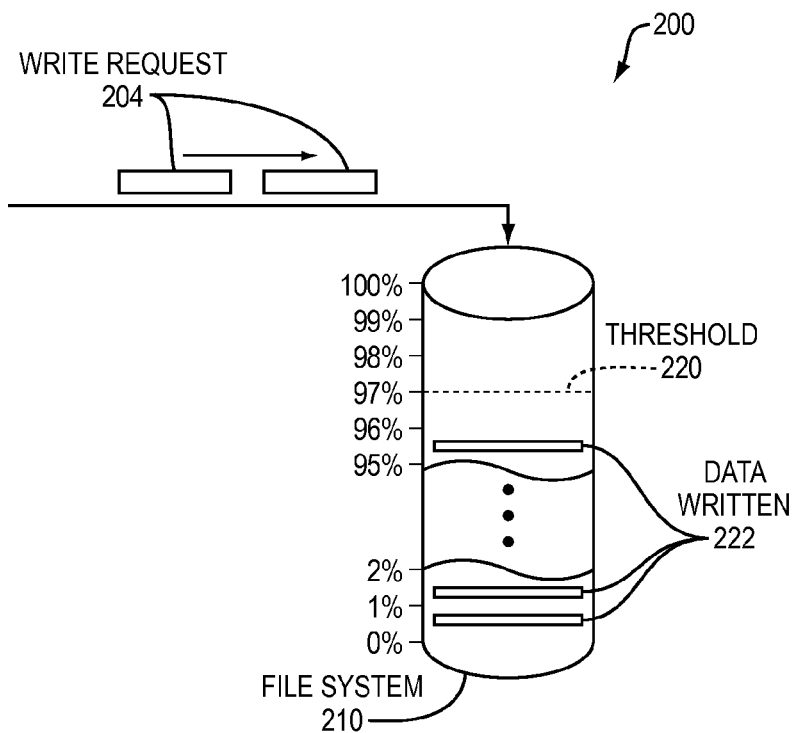
FIG. 2A is a block diagram illustrating an example embodiment of a filesystem and a threshold.

FIG. 2A is a block diagram 200 illustrating an example embodiment of a filesystem 210 and a threshold 220. The filesystem 210 receives a write request 204 to write data to the filesystem 210. The filesystem includes data written 222 up to a 96% capacity of the filesystem 210. The threshold 220 is set at the 97% capacity of the drive in this example. The particular write request 204 in this example happens to be large enough to fill 2% of the filesystem 210.

Figure 2B:
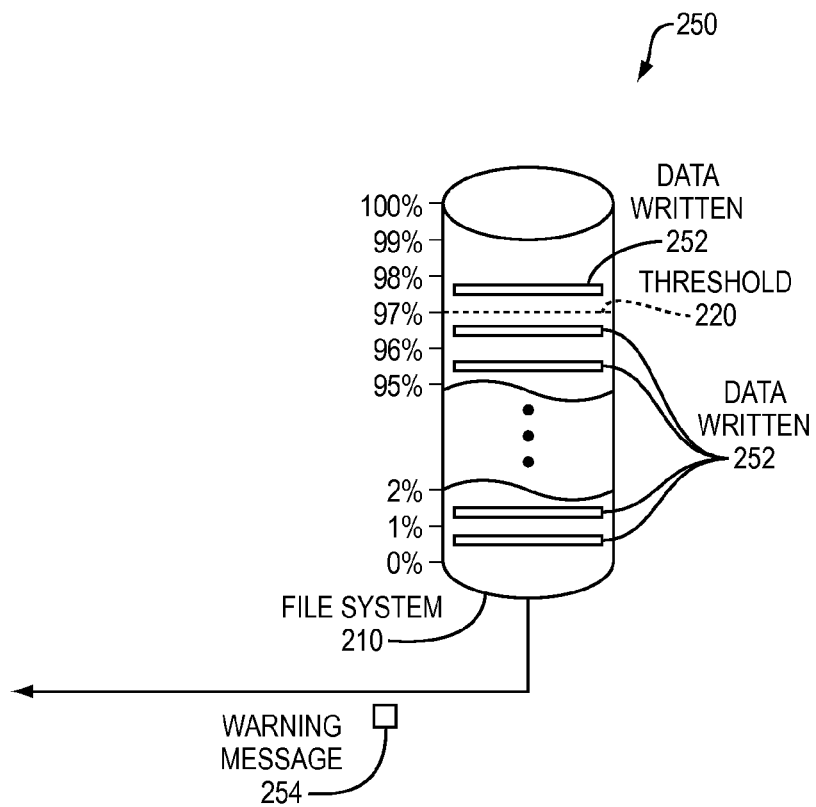
FIG. 2B is a diagram illustrating an example embodiment of the filesystem of FIG. 2A after a write request has been performed.

FIG. 2B is a diagram 250 illustrating an example embodiment of the filesystem 210 after the write request 204 of FIG. 2A has been performed. The filesystem 210 now includes data written 252 up to 98% of filesystem's capacity. This puts the filesystem 210 above the threshold 220 of 97%. Likewise, the filesystem 210 issues a warning message 254 to a host that indicates that the drive is above the threshold 220.

Figure 3A:
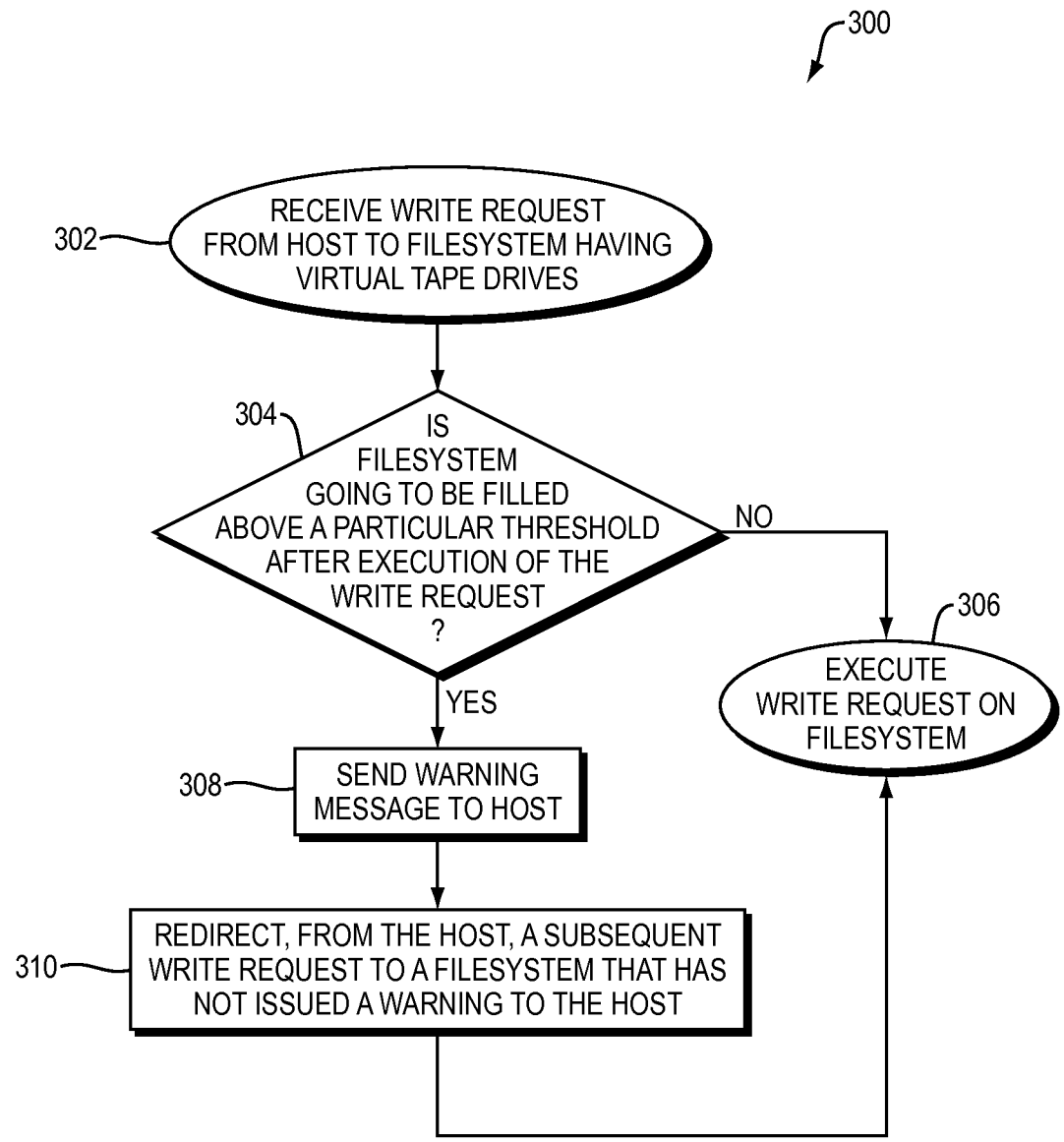
FIG. 3A is a flow diagram illustrating a process employed by an example embodiment of the present invention.

FIG. 3A is a flow diagram 300 illustrating a process employed by an example embodiment of the present invention. A filesystem within a storage array receives a write request from a host (302). The filesystem, as described herein, is storing a plurality of virtual tape drives. The storage array then determines whether the filesystem is going to be filled above a particular threshold after the execution of the write request (304). In certain embodiments, the filesystem itself can make the determination of whether it will be filled above the particular threshold after the execution of the write request. If the filesystem is not going to be filled above the particular threshold after the execution of the write request (304), the system executes the write request on the filesystem (306).

On the other hand, if the filesystem is going to be filled above the particular threshold, the system sends a warning message to the host (308). Then, the host can redirect subsequent write requests to other filesystems that have not issued a warning to the host (310). In this manner, the host avoids writing to the filesystem that is almost full, while the filesystem does not perform any active blocking or prevention of write requests other than sending the warning message. The filesystem then executes the write request on the filesystem (306). The filesystem can assume that the write request does not generate an error because the filesystem was below the particular threshold before the write request was executed, and a write request that both exceeds the particular threshold and fills the filesystem beyond its full capacity is unlikely. A designer of the system can set the particular threshold to be above the size of a typical write request such that only one particular write request cannot both exceed the particular threshold and fill up the entire filesystem. This gives the host a warning message so that the host can prevent subsequent write requests from filling the filesystem and generating a resultant error message.

Figure 3B:
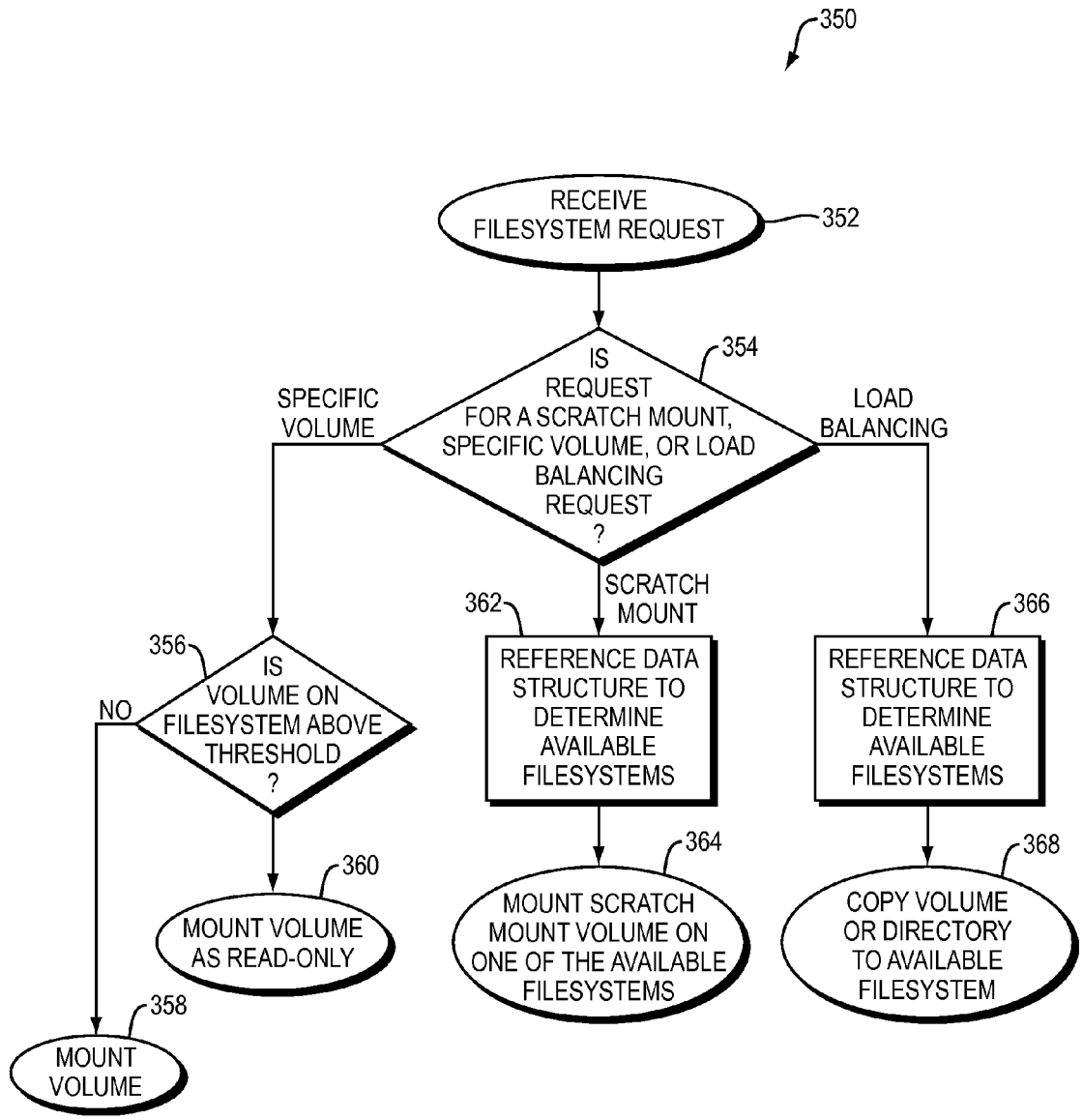
FIG. 3B is a flow diagram illustrating a process employed by an example embodiment of the present invention.

FIG. 3B is a flow diagram 350 illustrating a process employed by an example embodiment of the present invention. The system first receives a filesystem request (352) and responsive to the filesystem request, determines whether the request is for a scratch mount, to mount a specific volume, or load balancing request (354).

If the request is to mount a specific volume (354), the system determines whether the volume is stored on a filesystem that is above the particular threshold (356). If the filesystem is not above the particular threshold, the system mounts the volume (358). On the other hand, if the filesystem is above the particular threshold, the system mounts the volume as read-only (360).

If the request is to create a scratch mount (354), the system references a data structure of the storage array to determine which filesystems are available (362). The system then mounts the scratch mount volume on one of the available filesystems (364). The system can determine the filesystem to mount the scratch mount volume because a scratch mount request is agnostic to which filesystem it is mounted on.

If the request is a load balancing request (354), the system references the data structure to determine which filesystems are available (366). Then, the system copies the volume of the load balancing request to an available filesystem (368).

Figure 4:
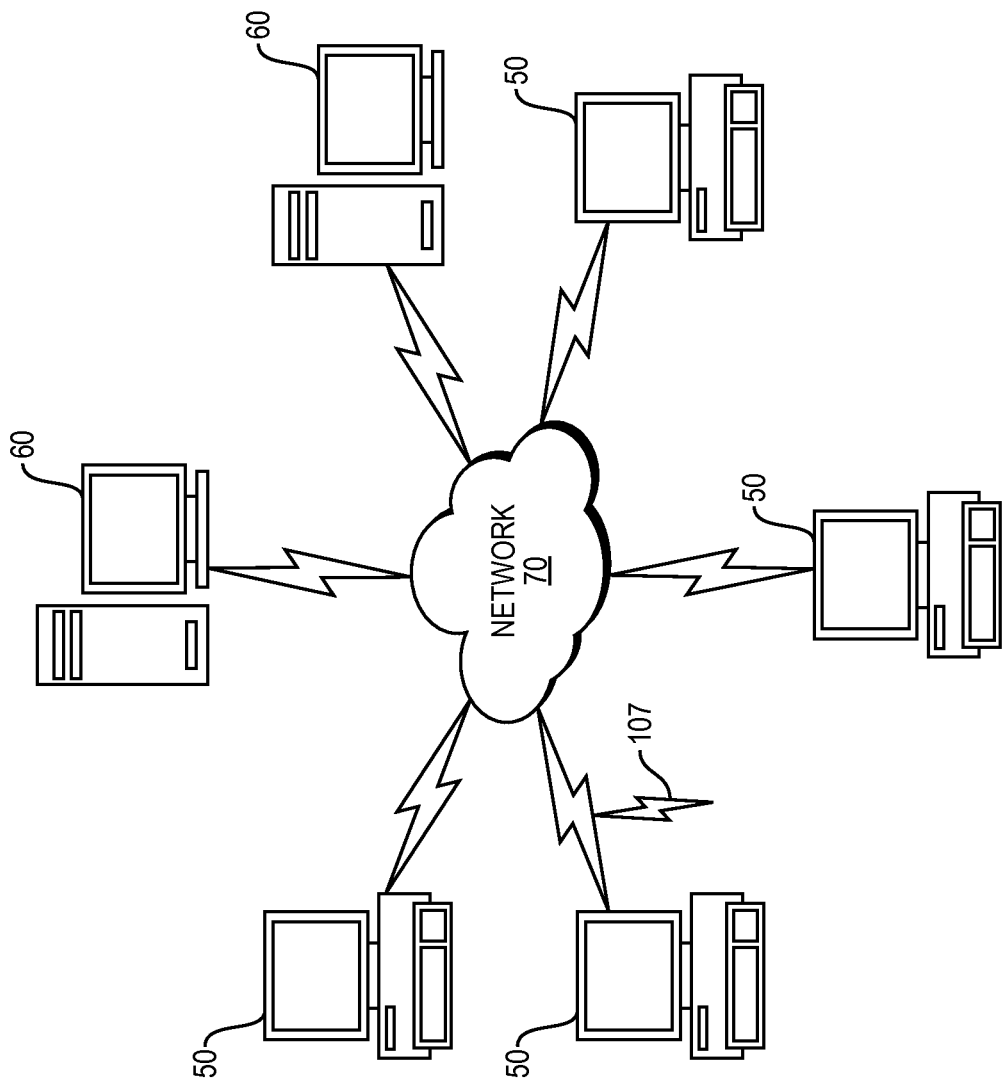
FIG. 4 illustrates a computer network or similar digital processing environment in which embodiments of the present invention may be implemented.

FIG. 4 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 5:
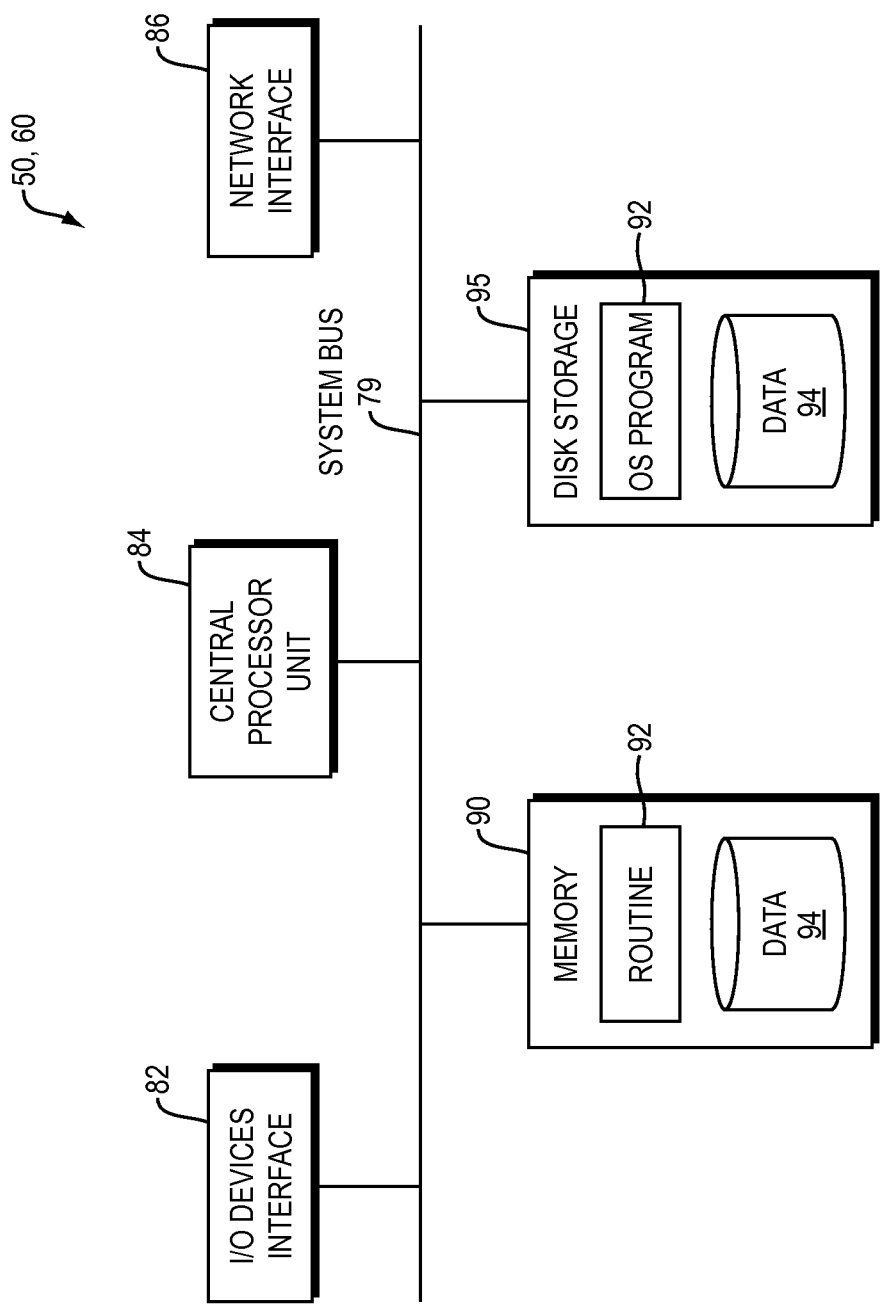
FIG. 5 is a diagram of an example internal structure of a computer (e.g., client processor/device or server computers) in the computer system of FIG. 4.

FIG. 5 is a diagram of an example internal structure of a computer (e.g., client processor/device 50 or server computers 60) in the computer system of FIG. 4. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 4). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

While this invention has been particularly shown and described with references to example embodiments thereof, it will be understood by those skilled in the art that various changes in form and details may be made therein without departing from the scope of the invention encompassed by the appended claims.

What is claimed is:

1. A method of informing a host system that a filesystem storing a plurality of virtual tapes is filled relative to a particular free space threshold, the method comprising:
    writing data to the filesystem responsive to a write request from the host system, the writing causing the filesystem to be filled above the free space threshold, the free space threshold being less than a maximum capacity of the file system;
    returning to the host system, responsive to the write request from the host system to a virtual tape stored by the filesystem, a message indicating that the filesystem has limited free space relative to the particular free space threshold;
    monitoring a plurality of filesystems, each filesystem storing a plurality of virtual tapes, for free space remaining on each of the plurality of filesystems;
    indicating, in a data structure stored in a memory, a particular filesystem that is filled above the particular threshold; and
    mounting, responsive to a request to mount a particular virtual tape that is on a filesystem indicated in the data structure as being above the particular threshold, the particular virtual tape as read-only.

2. The method of claim 1, wherein the data structure is at least one of a table and a list.

3. The method of claim 1, further comprising, responsive to a request to initiate a scratch mount, directing the request to a filesystem that is filled below the particular threshold.

4. The method of claim 1, further comprising, responsive to a usage balancing move request, directing the request to a filesystem that is filled below the particular threshold.

5. The method of claim 1, further comprising configuring the particular threshold responsive to a user input.

6. The method of claim 1, wherein the message indicates that the system is filled above the particular threshold.

7. A system for informing a host system that a filesystem storing a plurality of virtual tapes is filled relative to a particular free space threshold, the system comprising:
 a processor; and
 a memory with computer code instructions stored thereon, the memory operatively coupled to the processor such that the computer code instructions cause the processor to implement:
  a messaging module configured to return to the host system, responsive to a write request from the host system to a virtual tape stored by the filesystem, a message indicating that the filesystem has limited free space relative to the particular free space threshold;
  a monitor module configured to monitor a plurality of filesystems, each filesystem storing a plurality of virtual tapes, for free space remaining on each of the plurality of filesystems;
  a tracking module configured to indicate, in a data structure stored in a memory, a particular filesystem that is filled above the particular threshold; and
  a request direction module configured to mount, responsive to a request to mount a particular virtual tape that is on a filesystem indicated in the data structure as being above the particular threshold, the particular virtual tape as read-only;
 the filesystem configured to write data, responsive to a write request from the host system, the writing causing the filesystem to be filled above the free space threshold, the free space threshold being less than a maximum capacity of the file system.

8. The system of claim 7, wherein the data structure is at least one of a table and a list.

9. The system of claim 7, further comprising a request direction module configured to direct, responsive to a request to initiate a scratch mount, the request to a filesystem that is filled below the particular threshold.

10. The system of claim 7, further comprising a request direction module configured to direct, responsive to a usage balancing move request, the request to a filesystem that is filled below the particular threshold.

11. The system of claim 7, further comprising a settings module configured to set the particular threshold responsive to a user input.

12. The system of claim 7, wherein the message indicates that the system is filled above the particular threshold.

13. A non-transitory computer-readable medium configured to store instructions for informing a host system that a filesystem storing a plurality of virtual tapes is filled relative to a particular free space threshold, the instructions, when loaded and executed by a processor, cause the processor to:
 write data to the filesystem responsive to a write request from the host system, the writing causing the filesystem to be filled above the free space threshold, the free space threshold being less than a maximum capacity of the file system;
 return to the host system, responsive to a write request from the host system to a virtual tape stored by the filesystem, a message indicating that the filesystem has limited free space relative to the particular free space threshold;
 monitor a plurality of filesystems, each filesystem storing a plurality of virtual tapes, for free space remaining on each of the plurality of filesystems;
 indicate, in a data structure stored in a memory, a particular filesystem that is filled above the particular threshold; and
 mount, responsive to a request to mount a particular virtual tape that is on a filesystem indicated in the data structure as being above the particular threshold, the particular virtual tape as read-only.

14. The non-transitory computer-readable medium of claim 13, wherein the message indicates that the system is filled above the particular threshold.

* * * * *